Jan. 13, 1948.	D. J. DANIEL	2,434,550
COMBINATION IMPLEMENT
Filed Dec. 28, 1945
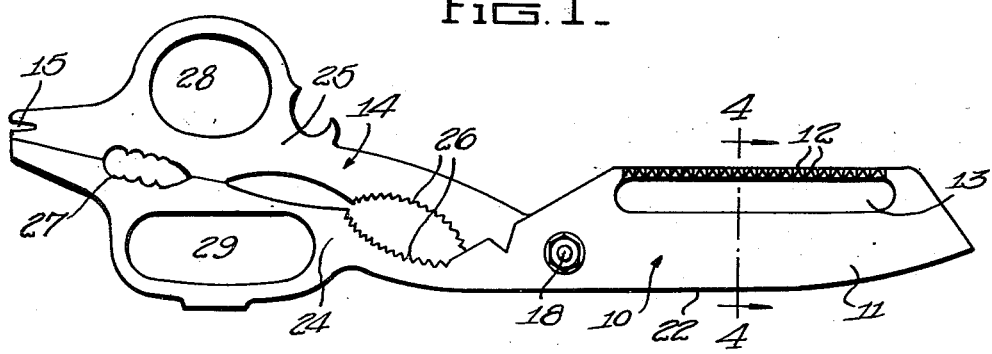
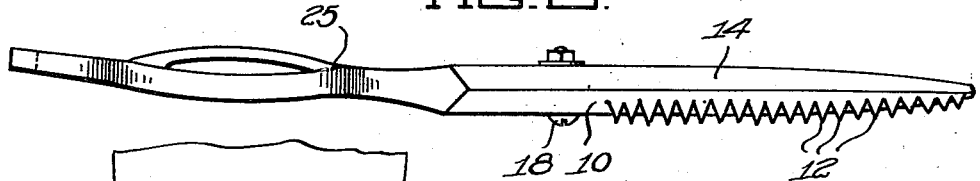
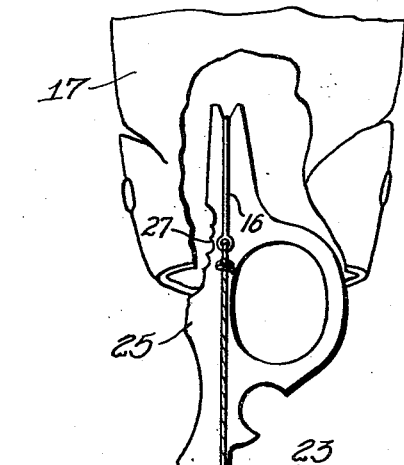
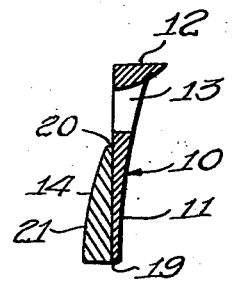
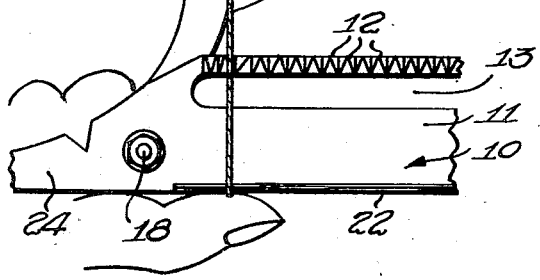
Inventor
D. J. DANIEL
By Bryant & Lowry
Attorneys Patented Jan. 13, 1948

2,434,550

UNITED STATES PATENT OFFICE 2,434,550

COMBINATION IMPLEMENT

Daniel J. Daniel, Fort Smith, Ark.

Application December 28, 1945, Serial No. 637,587

2 Claims. (Cl. 43—29)

This invention relates to a combination implement primarily adapted for use by fishermen.

The primary object of the invention is to provide a tool for the expeditious extraction of hooks from the mouths of fish.

Further, an aim is to provide such an implement or tool which can advantageously be embodied in a pair of pivoted levers and in fact in the blades of shears, the levers or blades coacting in the use of the tool as a hook extractor.

Various additional objects and advantages will be pointed out and otherwise become apparent from a consideration of the description following taken in connection with accompanying drawing illustrating an objective embodiment by way of example.

In said drawing:

Figure 1 is a view in side elevation illustrating one embodiment of the invention, Figure 2 is a top plan view of the device of Figure 1, Figure 3 is a fragmentary elevation on an enlarged scale, illustrating the use of the device in extracting a hook from the mouth of a fish, and Figure 4 is a cross-sectional view on an enlarged scale, taken on the line 4—4 of Figure 1.

Referring specifically to the drawings wherein like reference characters designate like or similar parts throughout the different views, I provide an element or blade 10 which may be in a single or integral piece and which has a concave outer face at 11. Such element or blade is thicker at one edge than at the other and at the thicker or upper edge the same is formed into a plurality or series of scaling serrations or teeth 12, which it will be noted have their longitudinal axes transverse to the general plane of the element or blade and the points or spurs of such teeth, as shown in Figures 2 and 4, extend beyond the concave surface 11, which latter is adapted to engage the scales and approximately conform to the shape of the body of the fish.

Adjacent to the teeth 12 and directly below the same, element or blade 10 is slotted as at 13 so that scales removed by the teeth 12 will readily pass or discharge therethrough, the slotting preferably consisting of an elongated slot of sufficient size to avoid danger of clogging of fish scales therein.

The invention embodies a fish hook extractor in the form of an element or blade 14 which may also be in a single or integral piece and which at one end has engaging and extracting means for a fish hook, said means comprising a slot or notch at 15 in order to bifurcate such end.

Notch or slot 15 is adapted to receive the portion of a fish hook 16 adjacent the barb of the hook when the barb is impaled in the mouth of a fish 17 as fragmentarily illustrated in Figure 3. It will be clear that during this operation, element 14 is inserted into the mouth of the fish and that a lateral extension thereon is of such size as to prevent undue closing or contraction of the mouth of the fish during the necessary manipulation of the element or blade in the extracting operation.

The invention may be very advantageously combined with or form parts of shears and it will be recognized that the blades 10 and 14 constitute blades of shears which are pivotally connected as at 18. The cutting edges of such blades 10 and 14, are shown respectively at 19 and 20, and it will be understood as shown that the contacting surfaces of said blades, to facilitate the cutting or shearing action, are preferably flat, as in Figure 4. Blade 14 at the outer surface 21 is preferably convex as shown in Figure 4 to better deflect or shed fish scales discharging through the slot 13.

Adjacent to the cutting edge 19, blade 10 is optionally roughened or knurled as at 22 for better retaining engagement with the fishing line 23 of the impaled hook 16, as in Figure 3.

Optionally, opposed edges of the blades 10 and 14 at handles 24 and 25 thereof, respectively, are suitably shaped and roughened or serrated at 26 and 27, respectively, for clipping engagement with articles, similar to the action of pliers when the blades are moved on the axis of pivot 18.

As is usual in shears, one blade, namely, 25, is provided with a lateral extension in which is formed an opening 28 for engagement by the thumb while the other blade at its handle 24 is provided with a lateral extension having an elongated opening 29 for engagement by fingers of the hand of the operator.

In the operation of the device to scale fish, the thumb of one hand of the operator is engaged in slot 29 and the middle finger of the same hand is engaged in the slot 28, such engagement, it being realized, being the reverse hold as for normal operation of shears or scissors. Thus held, the shears are turned to a position where the surface 11 is flat on the body of the fish to be scaled. Then by opening the blades 11 and 14 slightly, blade 14 at its inner surface lies flat on the fish just ahead of the blade 11 and as the movement of scaling begins, slight pressure on blade 14 causes the undulation of the fish scales, forcing their outer or distal edges upward and as the concave blade 11 passes thereover, the upward angle of the scales is continued and contact the scaling points or serrations 12, thus being lifted completey clear of the flesh of the fish and forced through the solt 13.

The operation of the device as an extractor for an impaled fish hook 16 is illustrated in Figure 3. The blades 11 and 14 are preferably clasped by a hand of the operator while such blades are approximately at a right angle to each other, the blade 11 thus constituting a handle or gripping means for the element or blade 14. During this operation, the line 23, passes between selected serrations or scaling points 12 and is pressed by one finger against the edge 22 of the blade 10, and is so held in a taut condition against slippage along the blade 10 with the curved end of the hook 16 adjacent the barb positioned within the notch 15 in the handle end of the blade 14. With the notched end 15 of the element 25 engaged with the hook as illustrated in Figure 3, it will be observed that the lateral extension on said element is in proximity of the mouth of the fish and holds the mouth in a widely opened condtiion for the free manipulation of the extractor. It is only necessary to force the extractor a slight additional distance into the mouth of the fish and by slight rotary movement thereof the barb of the hook is readily disengaged from the flesh of the fish without injury thereto and the extractor with the hook is then removed from the fish. During the entire operation the fishing line 23 remains in a taut condition, being held by the finger of the user and restrained from movement longitudinally of the blade 10.

Various changes may be resorted to provided they fall within the spirit and scope of the invention as defined by appended claims.

What is claimed is:

1. An implement of the class described having an elongated element for projection of an end portion thereof into the mouth of a fish, notched means on said end portion for engagement with a hook impaled in said mouth to extract the hook, and an element pivoted to and adapted to be disposed at an angle to the first-mentioned element to function as a handle in the manipulation of the implement, the second-mentioned element provided with a flange having serrations of substantial depth along the longitudinal edge nearest said means and disposed for engagement of the fishing line which carries said hook, when the line is clamped against the second-mentioned element by a finger of the fisherman during a hook-extracting operation.

2. An implement of the class described having an elongated element for projection of an end portion thereof into the mouth of a fish, notched means on said end portion for engagement with a hook impaled in said mouth to extract the hook, an element pivoted to and adapted to be disposed at an angle to the first-mentioned element to function as a handle in the manipulation of the implement, the second-mentioned element provided with a flange having serrations of substantial depth along the longitudinal edge nearest said means and disposed for engagement of the fishing line which carries said hook, when the line is clamped against the second-mentioned element by a finger of the fisherman during a hook-extracting operation, and laterally extending means on the elongated element substantially spaced from the notched means to maintain the mouth in open condition during a hook-extracting operation.

DANIEL J. DANIEL.

REFERENCES CITED

The following references are of record in the file of this patent:

UNITED STATES PATENTS

| Number | Name | Date |
|---|---|---|
| 422,670 | Wallace | Mar. 4, 1890 |
| 916,725 | Lafrentz | Mar. 30, 1909 |
| 1,263,526 | Calta | Apr. 23, 1918 |
| 2,244,270 | Verrett | June 7, 1941 |

FOREIGN PATENTS

| Number | Country | Date |
|---|---|---|
| 511,752 | Germany | Oct. 7, 1928 |